(12) United States Patent
Zheng et al.

(10) Patent No.: US 10,643,555 B2
(45) Date of Patent: May 5, 2020

(54) INTERNAL GAMMA CORRECTION FOR ELECTRONIC DISPLAYS

(71) Applicant: Apple Inc., Cupertino, CA (US)

(72) Inventors: Fenghua Zheng, San Jose, CA (US); Christopher P. Tann, San Jose, CA (US); Sandro H. Pintz, Menlo Park, CA (US); David S. Zalatimo, San Jose, CA (US); Jun Qi, San Jose, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/698,343

(22) Filed: Sep. 7, 2017

(65) Prior Publication Data

US 2018/0090084 A1 Mar. 29, 2018

Related U.S. Application Data

(60) Provisional application No. 62/398,688, filed on Sep. 23, 2016.

(51) Int. Cl.
*G09G 5/10* (2006.01)
*G09G 3/36* (2006.01)
*G06T 5/00* (2006.01)

(52) U.S. Cl.
CPC ............ *G09G 3/3611* (2013.01); *G06T 5/008* (2013.01); *G09G 3/3614* (2013.01); *G09G 3/3696* (2013.01); *G09G 2310/0291* (2013.01); *G09G 2320/0276* (2013.01); *G09G 2320/0673* (2013.01); *G09G 2340/0435* (2013.01); *G09G 2360/02* (2013.01); *G09G 2360/16* (2013.01)

(58) Field of Classification Search
CPC .. G09G 3/3611; G09G 3/3614; G09G 3/3696; G09G 2360/02; G09G 2340/0435; G09G 2310/0291; G09G 2320/0673; G09G 2360/16; G09G 2320/0276; G06T 5/008
See application file for complete search history.

(56) References Cited

U.S. PATENT DOCUMENTS

| 6,950,045 | B2 | 9/2005 | Kim |
| 7,554,517 | B2 | 6/2009 | Baum et al. |
| 8,471,875 | B2 | 6/2013 | Chaji et al. |
| 8,860,767 | B2 | 10/2014 | Yu et al. |
| 9,299,309 | B2 | 3/2016 | Tseng et al. |

(Continued)

*Primary Examiner* — Adam R. Giesy
(74) *Attorney, Agent, or Firm* — Fletcher Yoder P.C.

(57) ABSTRACT

Devices and methods for useful in providing localized synchronized and/or dynamic in-band internal gamma code adjustment per frame period are provided. By way of example, a display panel includes a data driver, which includes a first DAC configured to provide an internal gamma voltage signal to cause a first adjustment to an image data signal. The first adjustment is configured to selectively adjust the image data signal based at least in part on a refresh rate or a frame rate of the display panel. The data driver includes a second DAC coupled to the first DAC and configured to provide an external gamma voltage signal configured to provide a second adjustment to the image data signal, and an output buffer configured to supply the image data signal to pixels of the display panel, wherein the image data signal comprises the first adjustment and the second adjustment.

20 Claims, 10 Drawing Sheets

(56) References Cited

U.S. PATENT DOCUMENTS

| | | | | |
|---|---|---|---|---|
| 2010/0156944 A1* | 6/2010 | Haupt | ................ | G09G 3/3688 |
| | | | | 345/690 |
| 2011/0242140 A1* | 10/2011 | Lee | .................... | G09G 3/3648 |
| | | | | 345/690 |
| 2017/0124934 A1* | 5/2017 | Verbeure | ............ | G09G 3/3611 |

* cited by examiner

IN-BAND GAMMA BANK
SELECTION BASED ON FRAME RATE IN TCON

*FIG. 10*

IN-BAND GAMMA CALCULATION
BASED ON FRAME RATE IN TCON

INTERNAL GAMMA CORRECTION FOR ELECTRONIC DISPLAYS

CROSS-REFERENCE TO RELATED APPLICATIONS

This application claims the benefit of U.S. Provisional Application No. 62/398,688 entitled "Internal Gamma Correction for Electronic Displays" filed on Sep. 23, 2016, which is incorporated by reference herein its entirety for all purposes.

BACKGROUND

The present disclosure relates generally to electronic displays utilizing variable refresh rates, and more particularly, to internal gamma correction in electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic display may allow a user to perceive visual representations of information by successively writing frames of image data to a display panel of the electronic display. The frames of image data represent individual pixels on the display. The image data is sent to the electronic display in a digital representation. The electronic display converts the digital representation of the image data into an analog voltage or current, which is used to program the pixels of the electronic display.

To ensure that the image data is viewable by the human eye, image data may be transformed from a linear domain into what is known as a gamma domain. This gamma transformation accounts for the tendency of the human eye to see brightness changes non-linearly. That is, the human eye is able to notice relatively small differences in brightness levels for image data that is relatively dark, but the human eye will only notice increasingly larger steps between brightness levels as the image data gets brighter. Gamma transformation causes the image data to be presented in this non-linear form to enable the human eye to see the image data when it is displayed on the display. For a number of reasons, though, the proper gamma transformation may vary slightly depending on the display characteristics and behavior. For example, some displays may have localized areas of pixels on the display with greater or lesser brightness compared to other pixels of the display. Further, when the electronic display uses a variable refresh rate, the gamma behavior of the display may change as the refresh rates change.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Devices and methods for useful in providing localized synchronized and/or dynamic in-band internal gamma code adjustment per frame period are provided. By way of example, a display panel includes a data driver, which includes a first DAC configured to provide an internal gamma voltage signal to cause a first adjustment to an image data signal. In one example, the first adjustment is configured to selectively adjust the image data signal based at least in part on a refresh rate or a frame rate of the display panel. The data driver includes a second DAC coupled to the first DAC and configured to provide an external gamma voltage signal configured to provide a second adjustment to the image data signal, and an output buffer configured to supply the image data signal to pixels of the display panel, wherein the image data signal comprises the first adjustment and the second adjustment.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to electronic displays utilizing variable refresh rates, and particularly to devices and methods for providing localized synchronized and/or dynamic in-band internal gamma code adjustment per frame period based on the immediate refresh rate and/or frame rate, and, by extension, reducing and/or substantially eliminating image artifacts that may be caused by variable refresh rates. In certain embodiments, a timing controller (TCON) and a data driver or other processing devices that may include internal gamma code generation circuitry and internal gamma code setting circuitry. The TCON and the display driver may communicate via a column driver interface (CDI) protocol. In some embodiments, the internal gamma code generation circuitry may include an in-band gamma code bank selection logic that may be used to select one or more localized gamma correction voltages (e.g., gamma codes) based on, for example, the refresh rate and/or the frame rate for each frame period. In another embodiment, the internal gamma code generation circuitry may include an in-band gamma code calculation logic that may be used to calculate (e.g., in real-time) one or more localized gamma correction voltages (e.g., gamma codes) based on, for example, the immediate refresh rate and/or frame rate of the display per frame period. In this way, the presently disclosed embodiments may provide localized synchronized and/or dynamic in-band internal gamma code adjustment per frame period based on the immediate refresh rate and/or frame rate, and, by extension, reducing and/or substantially eliminating image artifacts that may be caused by variable refresh rates.

As used herein, "refresh rate" may refer to the frequency (e.g., in hertz [Hz]) at which frames of image data (e.g., first and second frames of image data) are written to an electronic display, or "refresh rate" may refer to the number of times that an image is refreshed per second. Similarly, as used herein, "frame rate" may refer to the frequency (e.g., in frames per second [FPS]) at which frames of image data are displayed.

Figure 1:
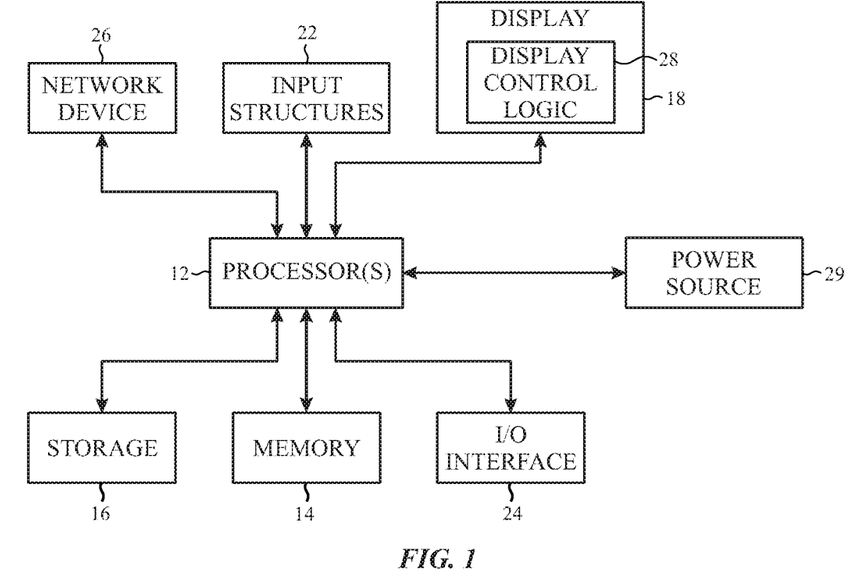
FIG. 1 is a schematic block diagram of an electronic device including display control circuitry, in accordance with an embodiment.

With these features in mind, a general description of suitable electronic devices useful in providing localized synchronized and/or dynamic in-band internal gamma code adjustment per frame period is provided. Turning first to FIG. 1, an electronic device 10 according to an embodiment of the present disclosure may include, among other things, one or more processor(s) 12, memory 14, nonvolatile storage 16, a display 18, input structures 22, an input/output (e.g., I/O) interface 24, network interfaces 26, display control logic 28, and a power source 29. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
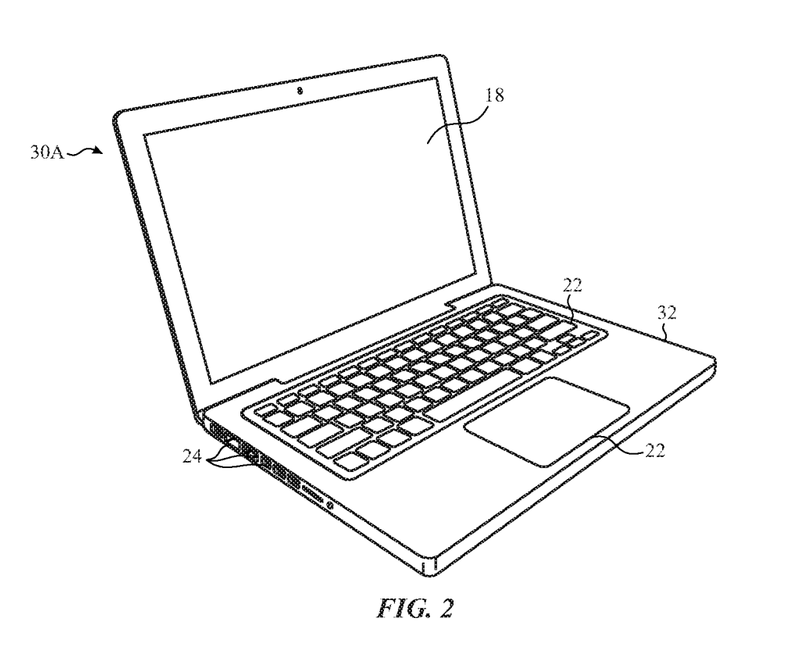
FIG. 2 is a perspective view of a notebook computer representing an embodiment of the electronic device of FIG. 1, in accordance with an embodiment.
Figure 3:
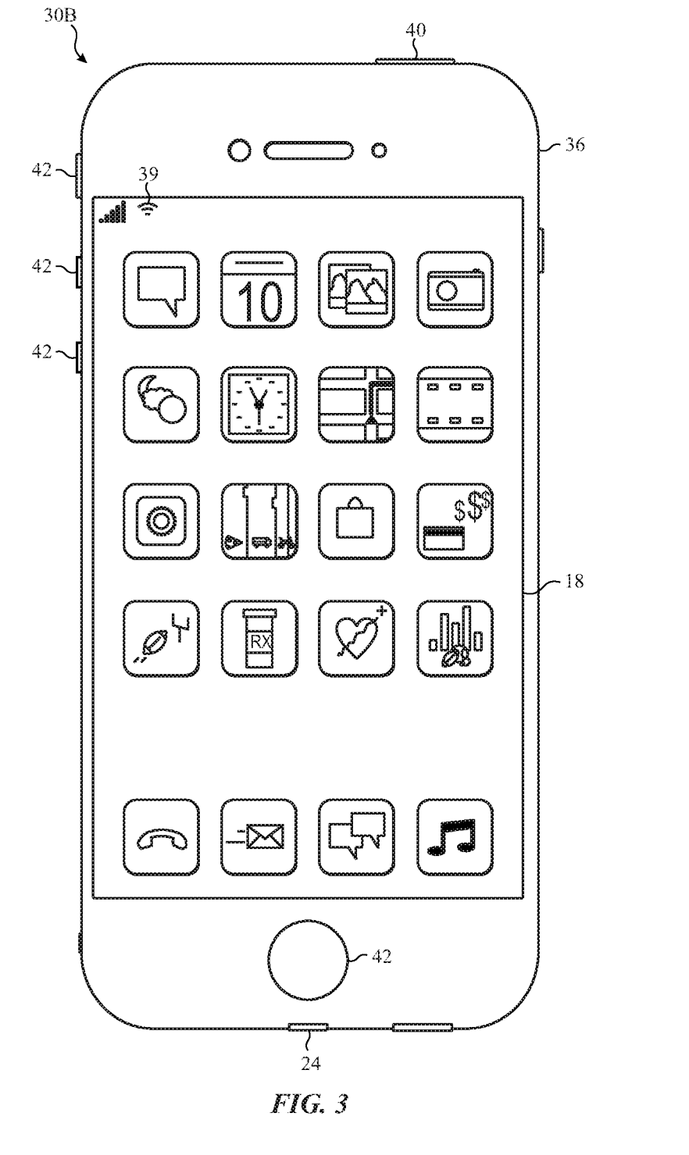
FIG. 3 is a front view of a hand-held device representing another embodiment of the electronic device of FIG. 1, in accordance with an embodiment.
Figure 4:
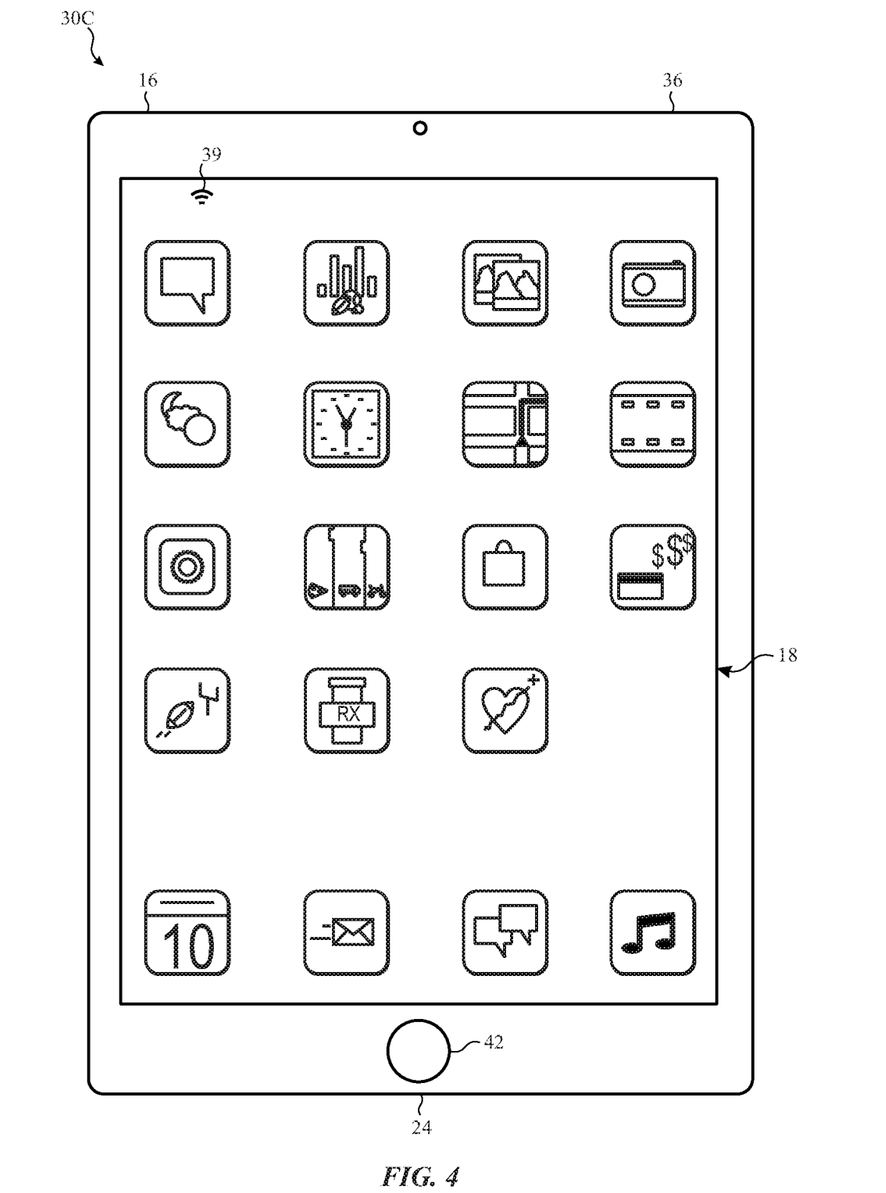
FIG. 4 is a front view of another hand-held device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (e.g., OLED) displays, or some combination of LCD panels and OLED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices, as may the network interfaces 26. The network interfaces 26 may include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The network interface 26 may also include interfaces for, for example, broadband fixed wireless access networks (e.g., WiMAX), mobile broadband Wireless networks (e.g., mobile WiMAX), and so forth. As further illustrated, the electronic device 10 may include a power source 29. The power source 29 may include any suitable source of power, such as a rechargeable lithium polymer (e.g., Li-poly) battery and/or an alternating current (e.g., AC) power converter.

In certain embodiments, the display 18 may further include display control logic 28. The display control logic 28 may be coupled to the processor(s) 12. The display control logic 28 may be used to receive a data stream, for example, from processor(s) 12, indicative of an image to be represented on display 18. The display control logic 28 may be an application specific integrated circuit (e.g., ASIC), or any other circuitry for adjusting image data and/or generate images on display 18. As will be further appreciated, the display control logic 28 may also include a timing controller (TCON) and a display driver that may be useful in providing localized synchronized and/or dynamic in-band internal gamma code adjustment per frame period generated based on, for example, the immediate refresh rate and/or frame rate.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 38 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (e.g., USB), or other similar connector and protocol.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Figure 5:
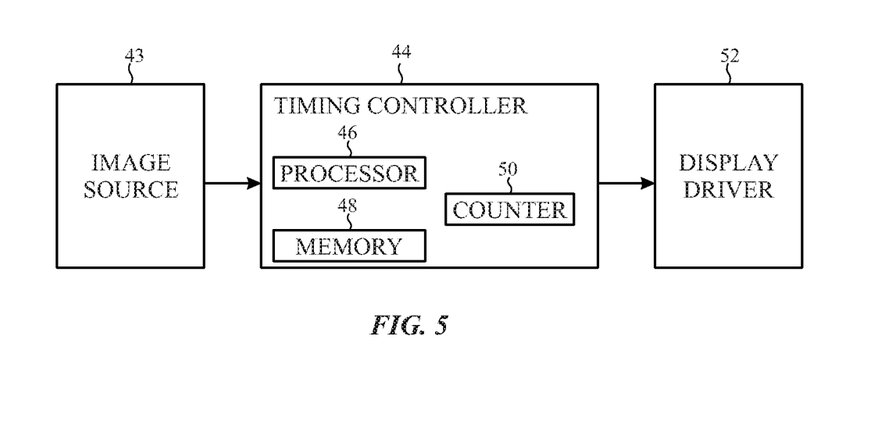
FIG. 5 is block diagram of the display control circuitry included in the electronic device of FIG. 1, including a timing controller (TCON) and a data driver, in accordance with an embodiment.

Turning now to FIG. 5, which illustrates the internal components of the display 18, and more specifically, the components that may be included as part of the display control logic 28. For example, as depicted, the display control logic 28 may include an image source 43, a timing controller (TCON) 44, and a display driver 52 (e.g., data driver, column driver, or source driver). The image source 43 may generate image data and transmit the image data to the TCON 44. Accordingly, in some embodiments, the image source 43 may be the processor 12 and/or image processing circuitry. Additionally, the TCON 44 may analyze the received image data and instruct the driver 52 to write a frame of image data to the pixels by applying a voltage to the display panel of the display 18.

As further illustrated, to facilitate the processing of the image data, the TCON 44 may, in some embodiments, include an internal processor 46 and internal memory 48. Specifically, the TCON 44 may utilize the internal processor 46 and internal memory 48 to analyze received image data to determine, for example, the magnitude of voltage to apply to each pixel to achieve the desired frame of image data to supply to the display driver 52 Additionally, the TCON 44 may analyze the received image data to determine the desired refresh rate at which to supply to the display driver 52.

In some embodiments, the TCON 44 may determine the desired refresh rate based on, for example, the number of vertical blank (VBLANK) lines and/or active lines included in the image data. For example, when the display 18 displays frames of image data with a resolution of 2880×1800, the TCON 44 may instruct the display driver 52 to display a first frame of image data at 60 Hz when the TCON 44 determines that the corresponding image data includes 52 vertical blank lines and 1800 active lines. Additionally, the TCON 44 may instruct the display driver 52 to display a second frame of image data at 30 Hz when the TCON 44 determine that the corresponding image data includes 1904 vertical blank lines and 1800 active lines.

Since each row of pixels in the display 18 is successively written, the duration a frame of image data is displayed may include the number of active lines in corresponding image data. Additionally, when a vertical blank line in the corresponding image data is received, the displayed frame of image data may continue to be displayed. As such, the total duration a frame of image data is displayed may be described as the sum of the number of vertical blank lines and the number of active lines in the corresponding image data. To help illustrate, continuing with the above example, the duration the first frame of image data is displayed may be 1852 lines and the duration the second frame of image data is displayed may be 3704 lines. In other words, a line may be used herein to represent a unit of time.

As described above, the duration positive and negative voltages are applied to the pixels of the display 18 may cause a pixel charge imbalance to accumulate on the pixels of the display 18. As such, in some embodiments, the TCON 44 may utilize a counter 50 to keep track of the duration each sets of voltage polarities are held by incrementing and/or decrementing based on, for example, the time period of which the positive and negative polarity voltages are applied to the pixels of the display 18 per frame period, as well as the monitored net pixel charge accumulation on the pixels of the display 18. For example, the counter 50 may increment the number of lines included in image data when the corresponding frame of image data is displayed with the first set of voltage polarities (e.g., positive frame). On the other hand, the counter 50 may decrement the number of lines included in image data when the corresponding frame of image data is displayed with the second set of voltage polarities (e.g., negative frame). Additionally or alternatively, the counter 50 may include a timer that keeps track of time each sets of voltage polarities are held, and may also track the pixel charge accumulation over time.

Figure 6:
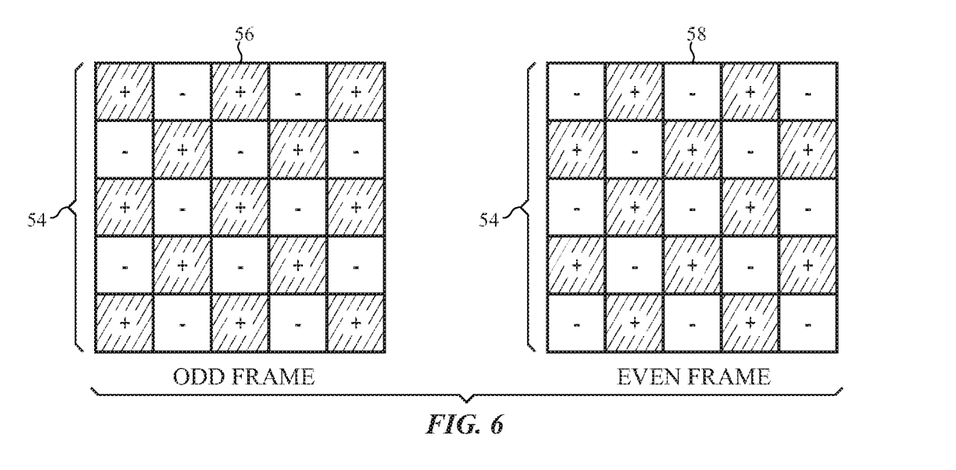
FIG. 6 is a diagram of a two dimensional grid of pixels utilizing a pixel inversion technique, in accordance with an embodiment.

FIG. 6 illustrates a pixel inversion technique that may be used by the display 18. However, it should be appreciated that the techniques discussed herein may be applied in displays utilizing any inversion technique such as, for example, a column inversion technique, a line inversion technique, a frame inversion technique, and so forth. For example, an odd frame pixel grid 56 may be a portion of the display 18 and that utilizes a dot inversion and/or pixel inversion method. During the odd frame, the odd frame pixel grid 56 may include 5×5 pixels 54, each with a corresponding voltage applied to the pixels 54. The applied voltage to the pixels 54 of the display 18 may alternate between a positive voltage polarity (e.g., $+V_{pixel}$) and a negative voltage polarity (e.g., $-V_{pixel}$) on a pixel by pixel basis.

For example, the top most row, the third row, and the fifth rows (e.g., rows 1, 3, and 5 of the odd frame pixel grid 56) may include a number of pixels 54 that may receive a positive voltage polarity (e.g., along columns 1, 3, and 5 of the pixel grid 56) and a negative voltage polarity (e.g., along columns 2 and 4 of the pixel grid 56). On the other hand, the second and fourth rows (e.g., rows 2 and 4 of odd frame pixel grid 56) may include five pixels 54 that receive a positive voltage polarity (e.g., along columns 2 and 4 of the pixel grid 56) and a negative voltage polarity (e.g., along columns 1, 3, and 5 of the even pixel grid 56).

As further illustrated in FIG. 6, during an even frame, rows 1, 3, and 5 of an even frame pixel grid 58 may include a number of pixels 54 that receive a positive voltage polarity (e.g., in columns 2 and 4 of the even frame pixel grid 58) and a negative voltage polarity (e.g., in columns 1, 3, and 5 of the even frame pixel grid 58). On the other hand, the second and fourth rows (e.g., rows 2 and 4 of the even frame pixel grid 58) may include five pixels 54 that receive a positive voltage (e.g., along columns 1, 3 and 5 of the even frame pixel grid 58) and a negative voltage (e.g., rows 2 and 4 of the even frame pixel grid 58) during the even frame. Specifically, during the even frame, each of the pixels 54 previously driven with a positive voltage polarity in the odd frame may be each then driven with negative voltage polarity, and vice versa.

It should be appreciated that the odd frame pixel grid 56 and the even frame pixel grid 58 as depicted in FIG. 6 may each represent a separate frame period. Indeed, in some embodiments, the odd frame pixel grid 56 and the even frame pixel grid 58 may each include a different refresh rate (e.g., variable refresh rate). For example, in one embodiment, the odd frame pixel grid 56 may be provided to the pixels 54 of the display 18 at a refresh rate of 60 Hz, while the even frame pixel grid 58 may be provided to the pixels 54 of the display 18 at a refresh rate of 30 Hz, and vice-versa. In another embodiment, the odd frame pixel grid 56 may be provided to the pixels 54 of the display 18 at a refresh rate of 120 Hz, while the even frame pixel grid 58 may be provided to the pixels 54 of the display 18 at a refresh rate of 60 Hz, and vice-versa.

Considering the variable refresh rates, in some embodiments, applying a generic gamma correction curve to compensate for the nonlinear transmittance-voltage (e.g., luminance-voltage) characteristics of, for example, the liquid crystal (LC) molecules that may be included in the display 18, may adjust the brightness (e.g., luminance) intensity of all pixels 54 without taking into consideration the applied variable refresh rates (e.g., 30 Hz, 60 Hz, 120 Hz) and the possibility that one or more localized areas of pixels 54 on the display 18 may include greater or lesser brightness variations as compared to other pixels 54 of the display 18.

Accordingly, in certain embodiments, as will be further appreciated with respect to FIGS. 7-14, it may be useful to provide a display driver 52 (e.g., data driver) including gamma code digital-to-analog (DAC) circuitry that may be used to provide localized synchronized and/or dynamic in-band internal gamma code adjustment per frame period based on, for example, the immediate refresh rate and/or frame rate of the display 18.

Figure 7:
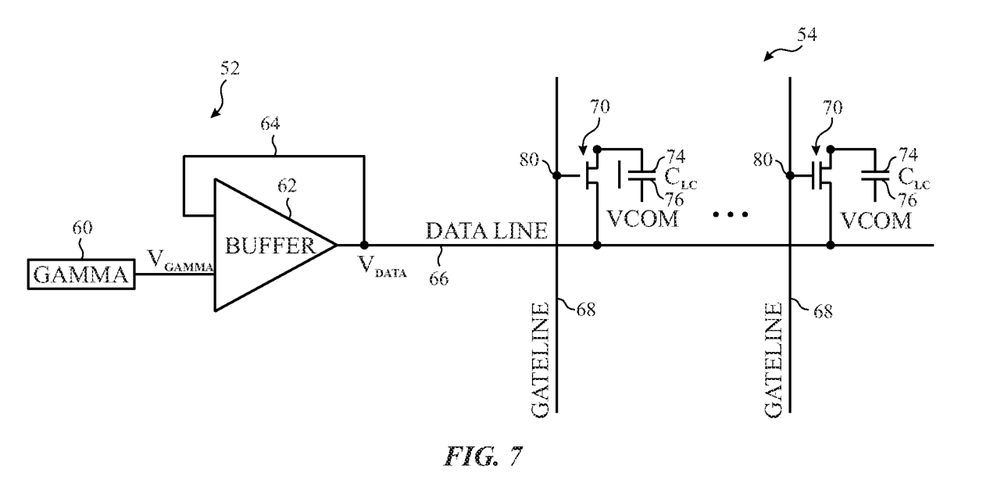
FIG. 7 is a block diagram of the data driver of FIG. 5 including a gamma DAC, in accordance with an embodiment.

Turning now to FIG. 7, which illustrates an embodiment of a circuit diagram (e.g., equivalent circuit) of the display driver 52 (e.g., source driver and/or column driver) that may be used to provide localized synchronized and/or dynamic in-band internal gamma code adjustment per frame period based on, for example, the immediate refresh rate of the display 18, which may include variable refresh (e.g., varying between 120 Hz, 90 Hz, 60 Hz, 45 Hz, 30 Hz, and so forth per frame period). As depicted, the display driver 52 may include one or more gamma code DAC(s) 60, which may each be electrically coupled to an output buffer 62. The output buffer 62 in conjunction with, for example, the gamma DAC(s) 60 may be used to drive the data lines 66, and, by extension, the TFTs 70 (e.g., activated via gate lines 68) in accordance with the present techniques.

In certain embodiments, the gamma DAC(s) 60 may be any device used to generate one or more gamma correction voltages used to compensate for the nonlinear transmittance-voltage (e.g., luminance-voltage) characteristics of, for example, the liquid crystal (LC) molecules that may be included, for example, in the display 18. For instance, in some embodiments, the gamma DAC(s) 60 may include a resistive DAC (R-DAC and/or R-2R DAC) (e.g., resistor string DAC), a capacitive DAC (CDAC), a binary-weighted DAC (BDAC), a serial DAC (SDAC), a combination thereof, or other similar DAC architecture that may be used to generate a gamma voltage value (e.g., gamma correction code) that may be supplied to output buffer 62 and used to compensate or invert, for example, the nonlinear transmittance-voltage characteristics that may be associated with the LC molecules (e.g., positioned between the pixel electrode 74 and the common electrode 76) of the display 18.

Specifically, in certain embodiments, the gamma DAC(s) 60 may be used to convert digital levels (e.g., gray levels) of the image data received from the TCON 44 into analog voltage data in accordance with, for example, a target gamma curve to produce "gamma-corrected" voltage data (e.g., $V_{GAMMA}$). As will be further appreciated, the gamma DAC(s) 60 may include a programmable internal gamma resistor string and an external gamma resistor string such that the "gamma-corrected" voltage data (e.g., $V_{INTERNAL\ GAMMA}$) generated by the programmable internal gamma resistor string of the gamma DAC(s) 60 may be used to selectively (e.g., based on the immediate refresh rate) scale or adjust one or more voltages (e.g., $V_{OUTPUT\ GAMMA}$) generated by the external gamma resistor string to an increased resolution, in accordance with the present techniques.

As further depicted by FIG. 6, the output of the gamma DAC(s) 60 may be input to the output buffer 62. Specifically, in some embodiments, the output buffer 62 may include an operational amplifier (OpAmp) (e.g., summing amplifier), which may include a feedback loop 64 and may be used to sum the internal gamma voltage (e.g., $V_{INTERNAL\ GAMMA}$) and the output gamma voltage (e.g., $V_{OUTPUT\ GAMMA}$) and the generated by the gamma DAC(s) 60. The output (e.g., $V_{DATA}$) of the output buffer 62 may be used to drive the data line 66, and, by extension, the respective TFTs 70 to provide gamma-corrected image data to the respective pixel electrodes 74 of the display 18. In some embodiments, a specific (e.g., local) gamma DAC(s) 60 and output buffer 62 may be provided for each data line 66 to drive the individual pixels 54. However, in other embodiments, the output buffers 62 may be provided to drive individual column and row pixels (e.g., pixel electrodes 74).

Furthermore, although not illustrated, it should be appreciated that the display driver 52 including the gamma DAC(s) 60 as illustrated in FIG. 6 may represent one embodiment of the display driver 52. For example, in other embodiments, particularly in which the display 18 utilizes a pixel inversion technique, the display driver 52 may include a respective positive gamma DAC(s) 60 and negative gamma DAC(s) 60 to respectively drive the positive polarity operation and the negative polarity operation of the unit pixels 54 and, by extension, the TFTs 70 of the display 18. For example, the positive gamma DAC(s) 60 may be used to generate positive gamma voltages (e.g., positive VGAMMA), while the negative gamma DAC(s) 60 may be used to generate negative gamma voltages (e.g., negative VGAMMA).

Figure 8:
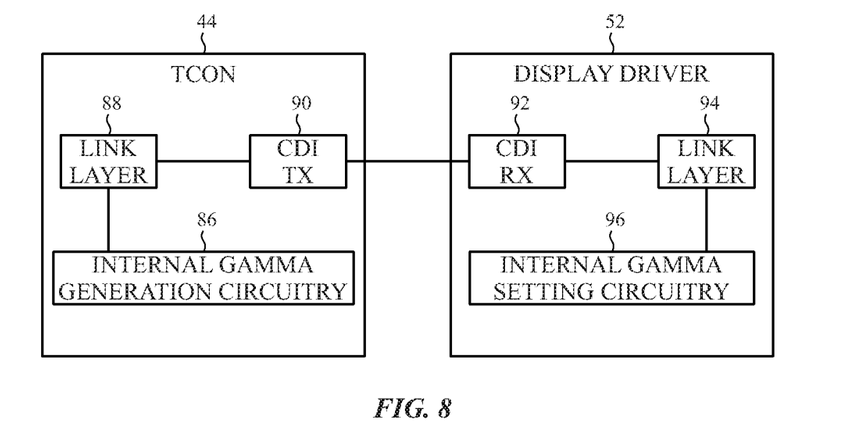
FIG. 8 is a detailed block diagram of the timing controller (TCON) and the data driver of FIG. 5, in accordance with an embodiment.

FIG. 8 illustrates further detailed embodiments of the TCON 44 and the display driver 52, and more specifically, the internal gamma code generation circuitry and internal gamma code setting circuitry implemented via the TCON 44 and the display driver 52, respectively. As illustrated, the TCON 44 and the display driver 52 may communicate via a column driver interface (CDI) protocol. For example, in certain embodiments, the TCON 44 may include internal gamma code generation circuitry 86, a communication link layer 88, and a CDI transmitter 90 (e.g., CDI TX).

Figure 10:
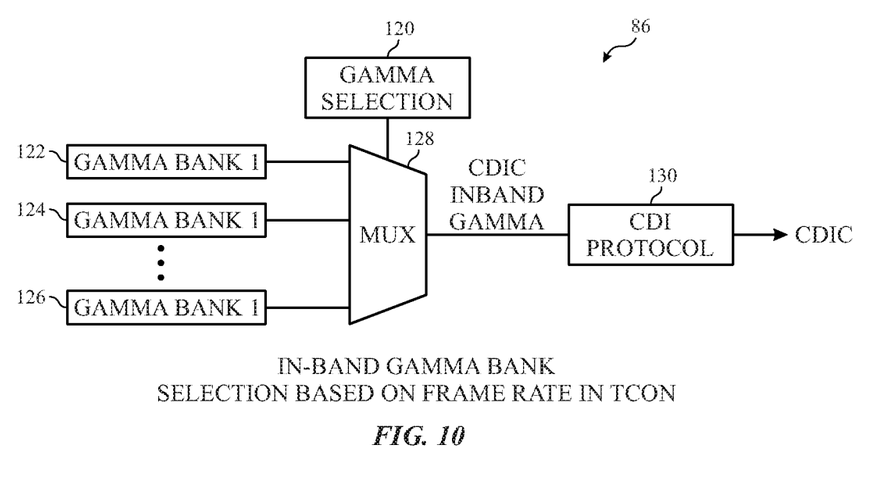
FIG. 10 is a schematic diagram of internal gamma code generation circuitry, including an in-band gamma code bank selection logic, in accordance with an embodiment.

As will be further appreciated with respect to FIG. 10, the internal gamma code generation circuitry 86 may include an in-band gamma code bank selection logic that may be used to select one or more localized gamma correction voltages (e.g., gamma codes) based on, for example, the refresh rate and/or the frame rate for each frame period. In another embodiment, as will be further appreciated with respect to FIG. 11, the internal gamma code generation circuitry 86 may include an in-band gamma code calculation logic that may be used to calculate (e.g., in real-time) one or more localized gamma correction voltages (e.g., gamma codes) based on, for example, the immediate refresh rate of the display 18 per frame period. The selected and/or calculated localized gamma correction code may be then transmitted to the display driver via the link layer 88 and the CDI transmitter 90 (e.g., CDI TX).

As further illustrated in FIG. 8, in certain embodiments, the display driver 52 may include a communication link layer 92, a CDI receiver 94 (e.g., CDI RX), and internal gamma code setting circuitry 96. As will be further appreciated with respect to FIG. 9, the internal gamma code setting circuitry 96 may include one or more gamma DAC(s) 60, which may each include one or more resistive DACs (e.g., R-DACs and/or R-2R DACs) that may generate respective positive and negative gamma code voltages to be supplied to localized pixels 54 of the display 18 based on, for example, the immediate refresh rate of the display 18 per frame period. For example, in one embodiment, the gamma DAC(s) 60 may include a 6-bit DAC, an 8-bit DAC, a 10-bit DAC, or higher resolution DAC.

Figure 9:
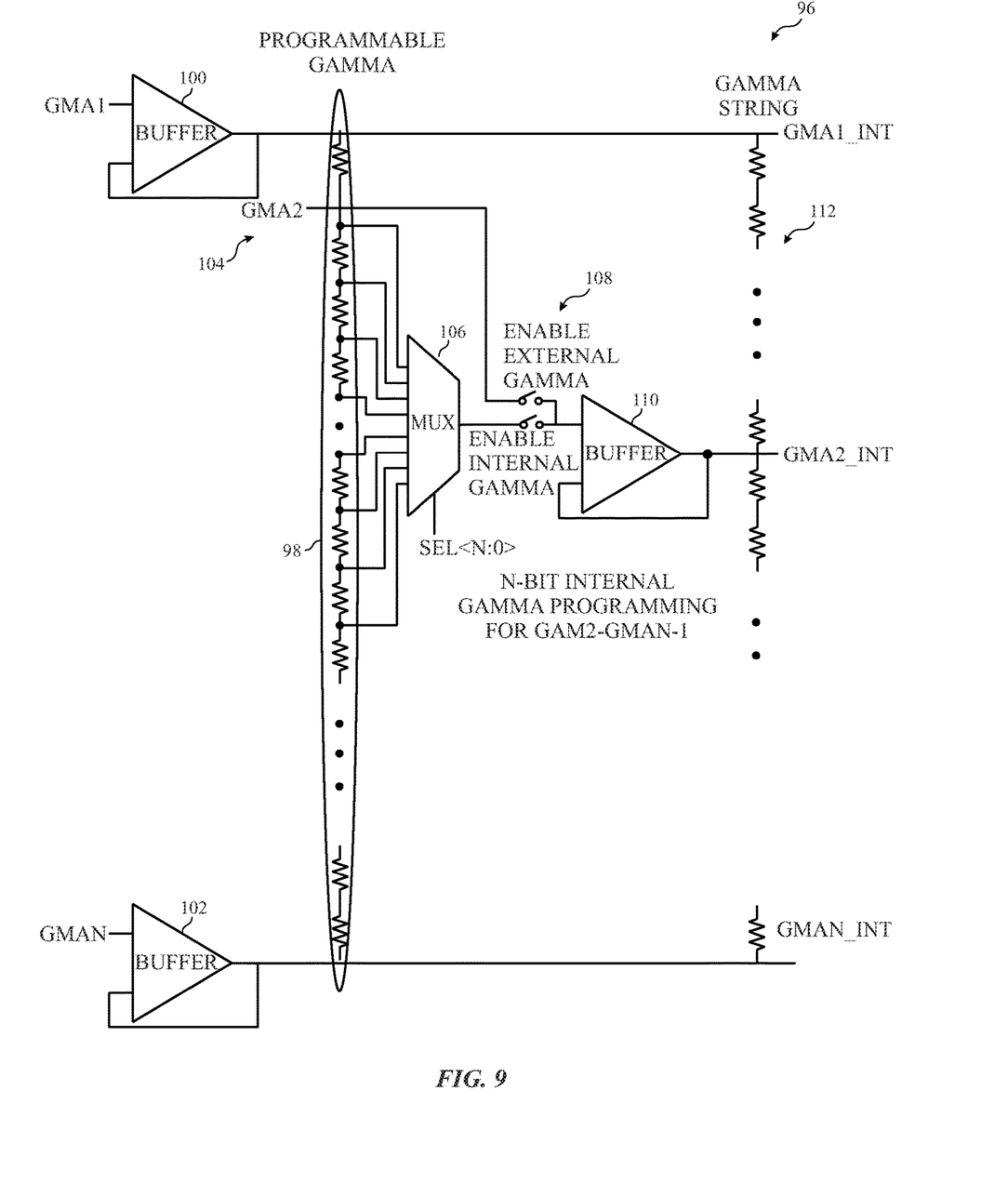
FIG. 9 is a schematic diagram of the data driver of FIG. 7, including internal gamma code setting circuitry, in accordance with an embodiment.

Turning now to FIG. 9, a detailed embodiment of the internal gamma code setting circuitry 96 is illustrated. Particularly, as depicted in FIG. 9, the internal gamma code setting circuitry 96 may include a programmable internal gamma resistor string 98. In one embodiment, the programmable internal gamma resistor string 98 may include a programmable resistor ladder, which may include a number of resistors connected in series, may be coupled between gamma code buffers 100 and 102. In certain embodiments, the programmable internal gamma resistor string 98 may be used to provide substantially evenly distributed positive and negative polarity reference voltages to a multiplexer (MUX) 106. For example, in some embodiments, the programmable internal gamma resistor string 98 may include $2^N$ resistors to provide voltages $V_1$ to $V_{2[<]BEGINITALmN}$, in which N may represent the resolution or the number of individual voltage quantized steps the programmable internal gamma resistor string 98 may generate. By way of example, 6-bit internal gamma DAC(s) 60 may result in voltages $V_0$ to $V_{63}$, 8-bit internal gamma DAC(s) 60 may result in voltages $V_0$ to $V_{255}$, 10-bit internal gamma DAC(s) 60 may result in voltages $V_0$ to $V_{1023}$, and so forth.

In one embodiment, the internal gamma DAC(s) 60 may include, for example, 10 6-bit internal gamma DACs 60 (e.g., 5 positive polarity internal gamma DACs 60 and 5 negative polarity internal gamma DACs 60) which may be used to selectively (e.g., based on the immediate refresh rate) generate one or more localized gamma code voltages (e.g., $V_{INTERNAL\ GAMMA}$) with increased resolution (e.g., quantized voltage steps $V_0$ to $V_{63}$) when, for example, the refresh rate of the display 18 switches (e.g., from 30 Hz to 60 Hz, from 60 Hz to 90 Hz, from 90 Hz to 120 Hz, and/or combinations thereof). For example, in certain embodiments, the buffer 100 may be coupled to the upper tap or upper rail of the programmable internal gamma resistor string 98 and the external gamma resistor string 112 to provide a reference voltage (e.g., $V_{DD}$) for the programmable internal gamma resistor string 98 and the external gamma resistor string 112.

Similarly, the buffer 102 (e.g., OpAmp) may be coupled to the programmable internal gamma resistor string 98 to provide a lower reference voltage signal to, for example, the lower tap or lower rail of the programmable internal gamma resistor string 98 and the external gamma resistor string 112.

In one embodiment, the lower reference voltage signal may substantially correspond to the common mode voltage input (e.g., $V_{CM}$) received by the buffer 102, or otherwise, may be based on the common mode voltage input (e.g., $V_{CM}$).

In certain embodiments, as further depicted by FIG. 9, the MUX 106 may be coupled to one or more taps of the programmable internal gamma resistor string 98. The programmable internal gamma resistor string 98 may provide internal gamma voltages (e.g., respective positive and negative gamma codes) to the MUX 106 to selectively (e.g., based on the immediate refresh rate) scale or adjust one or more voltages (e.g., $V_{OUTPUT}$ GAMMA) generated by the external gamma resistor string 112. In some embodiments, the programmable internal gamma resistor string 98 may provide local internal gamma voltages useful in adjusting for gamma voltage variation between, for example, −0.2 and +0.2 (e.g., based on the maximum gamma swing observed experimentally).

For example, the programmable internal gamma resistor string 98 may provide the internal gamma voltages to the MUX 106, which may then select from, for example, a range of 6-bit (e.g., quantized voltage steps $V_0$ to $V_{63}$) internal gamma voltages. In certain embodiments, the MUX 106 may select the internal gamma voltages (e.g. internal gamma codes) based on, for example, a received input $V_{SEL}$, which may be a programmable or adjustable value (e.g., 6-bit digital code or other N-bit digital code) that may be useful in providing select bits to the MUX 106 to offset any effect pixel voltage (e.g., $V_{pixel}$) or other voltages may have on the internal gamma voltages generated by the programmable internal gamma resistor string 98.

The MUX 106 may then pass the selected internal gamma voltages (e.g., internal gamma codes) to another buffer 110 (e.g., OpAmp) when a switch 108 (e.g., "Enable Internal Gamma") is closed and a switch 109 (e.g., "Enable External Gamma") is opened (e.g., corresponding to a switch in the refresh rate and/or the frame rate of the display 18). On the other hand, when the gamma signal 104 is provided to the buffer 110 MUX 106 when the switch 108 (e.g., "Enable Internal Gamma") is open and the switch 109 (e.g., "Enable External Gamma") is closed, only the external gamma resistor string 112 may be used. The buffer 110 (e.g., OpAmp) may then provide the internal gamma voltages (e.g., internal gamma codes) to the external gamma resistor string 112. One or more output buffers (e.g., output buffer 62) may then provide an image data signal (e.g., $V_{Data}$) adjusted according to the internal gamma resistor string 98 and/or the external gamma resistor string 112.

As previously discussed, in certain embodiments, the internal gamma code generation circuitry 86 may include an in-band gamma code bank selection logic that may be used to select one or more localized internal gamma correction voltages (e.g., gamma codes) based on, for example, the refresh rate and/or frame rate for each frame period. For example, as depicted in FIG. 10, the internal gamma code generation circuitry 86 may include a gamma code selection block 120 and gamma code banks 122, 124, and 126, and a MUX 128. The gamma code selection block 120 may be used to pass selection bits (e.g., 6-bit digital code or other N-bit digital code) to the MUX 128 based on, for example, the current refresh rate and/or frame rate per frame period. Similarly, the gamma code banks 122, 124, and 126 may respectively store internal gamma voltages to be provided to the MUX 128. The MUX 128 may then select an internal gamma voltage (e.g., received from the gamma code banks 122, 124, and 126 to the display driver 52 via a CDI protocol block 130.

Figure 11:
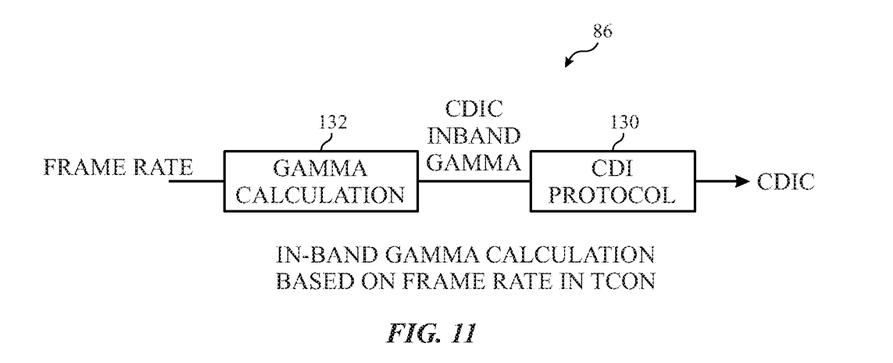
FIG. 11 is a schematic diagram of internal gamma code generation circuitry, including in-band gamma code calculation logic, in accordance with an embodiment.

In another embodiment, as illustrated by FIG. 11, the internal gamma code generation circuitry 86 may include an in-band gamma code calculation logic that may be used to calculate (e.g., in real-time) one or more localized internal gamma correction voltages (e.g., gamma codes) based on, for example, the immediate refresh rate of the display 18 per frame period. Specifically, a gamma calculation block 132 may receive a signal or indication of the immediate refresh rate and/or frame rate and calculate code (e.g., in real-time) one or more localized gamma correction voltage codes to be provided to the display driver 52 via a CDI protocol block 130.

Figure 12:
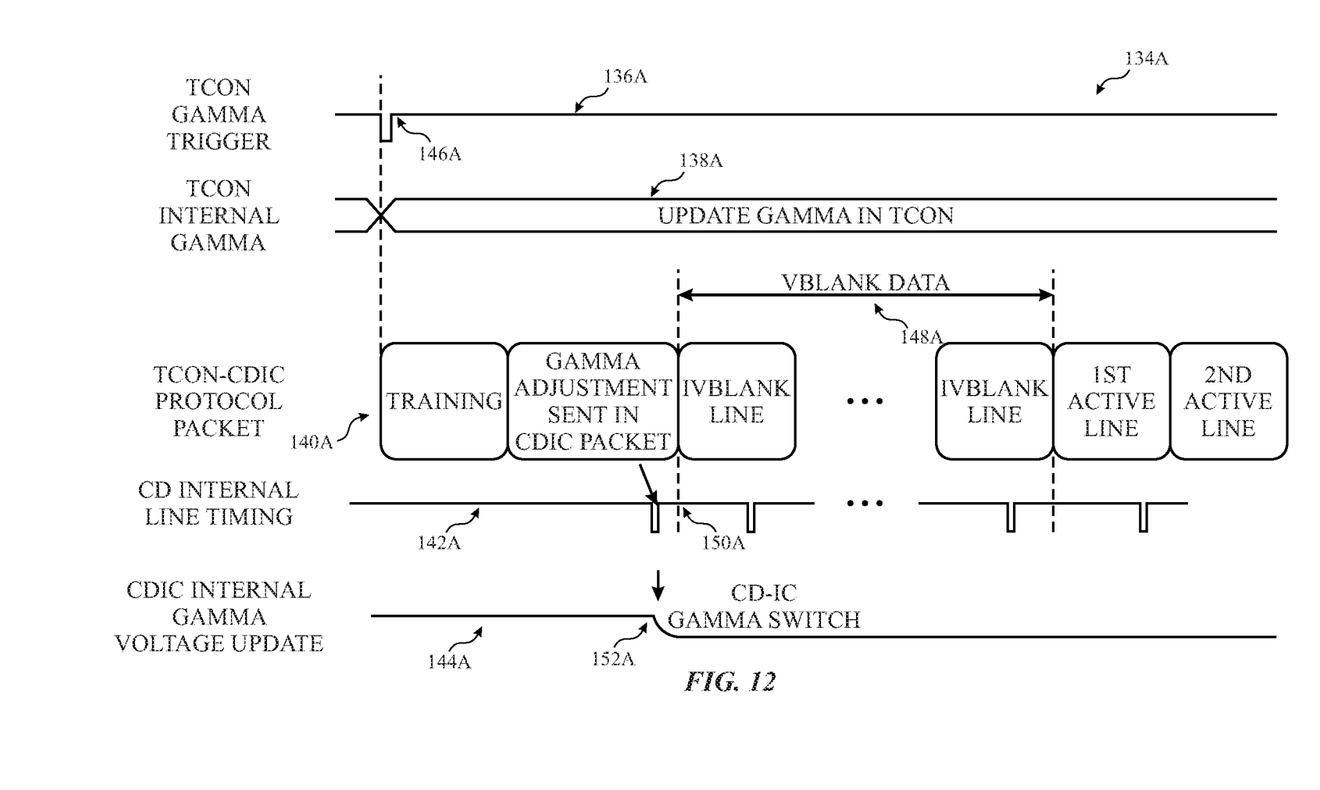
FIG. 12 is a timing diagram of a dynamic internal gamma code generation technique, in accordance with an embodiment.

FIG. 12 illustrates a timing diagram 134A that depicts the timing of the synchronized generation and the refresh update of one or more internal gamma voltages (e.g., internal gamma codes). Specifically, the timing diagram 134A includes a TCON gamma trigger signal 136A, a TCON internal gamma signal 138A, TCON-to-display driver protocol data packet 140A, a display driver internal pixel line timing signal 142A, and display driver internal gamma voltage update signal 144A. In certain embodiments, the TCON gamma trigger signal 136A may be received by the TCON 44. At the falling edge 146A of the TON gamma trigger signal 136A, the TCON 44 may generate the TCON internal gamma signal 138A and generate the data packet 140A. As further depicted, at the falling edge 150A of the display driver internal pixel line timing signal 142A, the display driver internal gamma voltage update signal 144A may be generated (e.g., substantially corresponding to a vertical blanking (Vblank) period 148A) and transmit the internal gamma voltages (e.g., internal gamma codes) to the display driver 52 to update one or more localized pixels 54 of the display 18.

Figure 13:
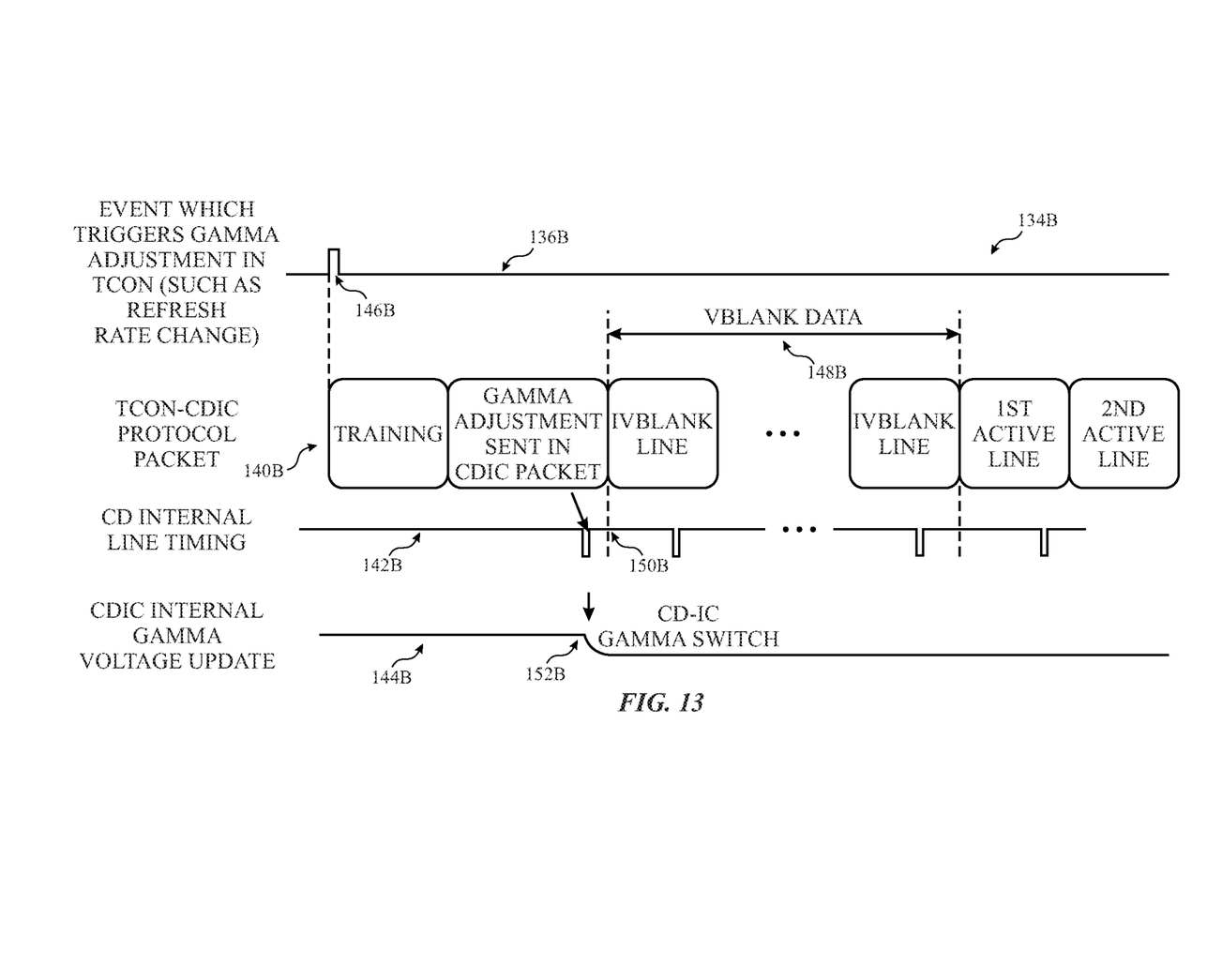
FIG. 13 is a timing diagram of a synchronized internal gamma code generation technique, in accordance with an embodiment.

FIG. 13 illustrates a timing diagram 134B that depicts the timing of tie dynamic generation and the refresh update of one or more internal gamma voltages (e.g., internal gamma codes). Specifically, the timing diagram 134B includes a TCON gamma trigger signal 136B, TCON-to-display driver protocol data packet 140B, a display driver internal pixel line timing signal 142B, and display driver internal gamma voltage update signal 144B. In certain embodiments, as generally discussed above with respect to FIG. 12, the TCON gamma trigger signal 136B may be received by the TCON 44. At the falling edge 146B of the TCON gamma trigger signal 136B (e.g., corresponding to a change in refresh rate and/or frame rate of the display 18), the TCON 44 may generate the TCON internal gamma signal 138B and generate the data packet 140B. As further depicted, at the falling edge 150B of the display driver internal pixel line timing signal 142B, the display driver internal gamma voltage update signal 144B may be generated (e.g., substantially corresponding to a vertical blanking (Vblank) period 148B) and transmit the internal gamma voltages (e.g., internal gamma codes) to the display driver 52 to update one or more localized pixels 54 of the display 18.

Figure 14:
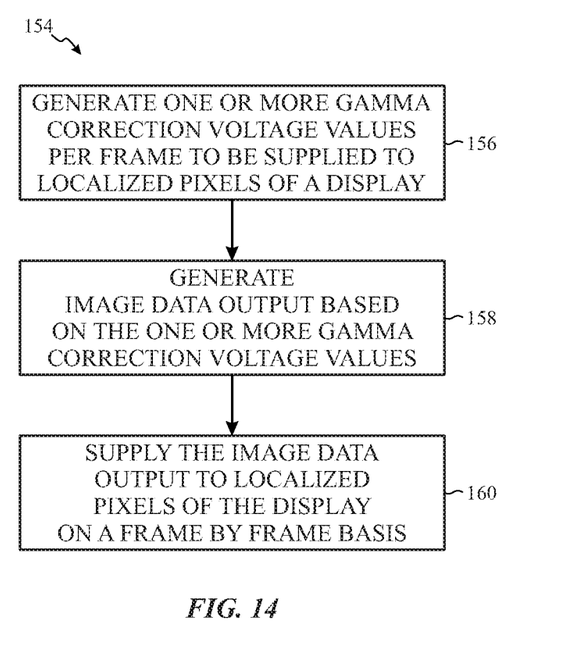
FIG. 14 is a flow diagram illustrating an embodiment of a process providing localized synchronized and/or dynamic in-band internal gamma code adjustment per frame period, in accordance with an embodiment.

Turning now to FIG. 14, a flow diagram is presented, illustrating an embodiment of a process 154 useful in providing localized synchronized and/or dynamic in-band internal gamma code adjustment per frame period based on, for example, the immediate refresh rate of the display 18 utilizing the TCON 44 and the display driver 52 included as part of the display 18 and depicted in FIGS. 5 and 8. The process 154 may include code or instructions stored in a non-transitory machine-readable medium (e.g., the memory 14) and executed, for example, by the one or more processor(s) 12 and/or the TCON 44 and the display driver 52. The process 154 may begin with the TCON 44 generating (block 156) one or more gamma correction voltages per frame to be supplied to the localized pixels 54 of the display 18 based on, for example, the immediate refresh rate and/or frame period. The process 154 may continue with the display driver 52 generating (block 158) an image data output signal based on the one or more gamma correction voltages. The process 154 may then conclude with the display driver 52 supplying (block 160) the image data output signal to the localized pixels 54 of the display 18 on a frame by frame basis. In this way, the presently disclosed embodiments may provide localized synchronized and/or dynamic in-band internal gamma code adjustment per frame period based on the immediate refresh rate and/or frame rate, and, by extension, reducing and/or substantially eliminating image artifacts that may be caused by variable refresh rates.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A display panel, comprising:
   a data driver, comprising:
      a first digital to analog converter (DAC) configured to provide an internal gamma voltage signal, wherein the internal gamma voltage signal varies based at least in part on a refresh rate or a frame rate of the display panel;
      a second DAC coupled to the first DAC and configured to provide an external gamma voltage signal based at least in part on the internal gamma voltage signal and configured to provide voltage signals for use in generating an image data signal to be supplied to pixels of the display panel; and
      an output buffer configured to supply the image data signal to pixels of the display panel.

2. The display panel of claim 1, wherein the first DAC is configured to provide a first gamma voltage correction value as the internal gamma voltage signal.

3. The display panel of claim 2, wherein the second DAC is configured to provide a second gamma voltage correction value as the external gamma voltage signal.

4. The display panel of claim 1, wherein the first DAC is configured to provide a first gamma correction value corresponding to a positive image data signal and a second gamma correction value corresponding to a negative image data signal.

5. The display panel of claim 1, wherein the first DAC is configured to provide the internal gamma voltage signal to selectively adjust the image data signal by providing the internal gamma voltage signal to the second DAC when the refresh rate or the frame rate of the display panel changes.

6. The display panel of claim 1, wherein the first DAC is configured to provide a plurality of sets of internal gamma voltage correction values, and wherein each of the plurality of sets of internal gamma voltage correction values corresponds to a different refresh rate or a different frame rate of the display panel.

7. The display panel of claim 6, wherein each of the plurality of sets of internal gamma voltage correction values comprises approximately 5 positive internal gamma voltage correction values and approximately 5 negative internal gamma voltage correction values.

8. The display panel of claim 1, wherein the display panel comprises a variable refresh rate electronic display.

9. The display panel of claim 1, comprising a timing controller (TCON) configured to generate the internal gamma voltage signal and to provide the internal gamma voltage signal to the data driver via a column driver interface (CDI) protocol.

10. The display panel of claim 1, wherein the first DAC is configured to provide the internal gamma voltage signal to reduce or substantially eliminate a possible occurrence of artifacts on the display panel.

11. A method of operating an electronic display, comprising:
   receiving, into a display driver circuitry, a digital gamma code:
   generating, in the display driver circuitry, one or more internal gamma correction voltages per frame based on the digital gamma code to be selectively supplied to localized pixels of the electronic display, wherein the electronic display is configured to operate at variable refresh rates;
   generating an image data output signal per frame based at least in part on the one or more internal gamma correction voltages; and
   supplying the image data output signal to the localized pixels of the electronic display on a frame by frame basis.

12. The method of operating the electronic display of claim 11, wherein generating the one or more internal gamma correction voltages comprises generating positive polarity gamma correction voltages and negative polarity gamma correction voltages.

13. The method of operating the electronic display of claim 11, wherein generating the one or more internal gamma correction voltages per frame comprises generating the one or more internal gamma correction voltages according to the variable refresh rates.

14. An electronic device, comprising:
   a timing controller (TCON) comprising internal gamma code generation circuitry configured to generate a first set of internal gamma code voltages; and
   a column driver coupled to the TCON and configured to transmit image data to one or more pixels of a liquid crystal display (LCD), comprising:
      a first resistor string configured to receive the first set of internal gamma code voltages and to provide a second set of internal gamma code voltages based thereon;
      a multiplexer (MUX) coupled to the first resistor string and configured to select one or more of the second set of internal gamma code voltages based at least in part on a refresh rate or a frame rate of the LCD;
      a second resistor string coupled to the MUX and configured to receive the selected one or more of the second set of internal gamma code voltages to adjust the image data; and an output buffer configured to supply the adjusted image data to pixels of the LCD.

15. The electronic device of claim 14, wherein the MUX is configured to selectively provide the one or more of the second set of internal gamma code voltages to the second resistor string when the refresh rate or the frame rate changes.

16. The electronic device of claim 14, wherein the first resistor string and the second resistor string each comprises a plurality of resistors coupled one to another in series.

17. The electronic device of claim 16, wherein the plurality of resistors comprises $2^N$ resistors, and wherein N comprises a resolution in bits.

18. The electronic device of claim 14, wherein the first resistor string comprises less resistors than the second resistor string.

19. The electronic device of claim 14, comprising a buffer coupled to the MUX and to the second resistor string, wherein the buffer is configured to receive an indication of when to switch between allowing the one or more of the second set of internal gamma code voltages to pass to the second resistor string and disallowing the one or more of the second set of internal gamma code voltages to pass to the second resistor string.

20. The electronic device of claim 14, wherein the output buffer is configured to supply the adjusted image data to localized pixels of the LCD.

* * * * *